United States Patent [19]
Leiderer

[11] Patent Number: 5,614,821
[45] Date of Patent: Mar. 25, 1997

[54] CONTACTLESS SPEED OR POSITION SENSOR USING A DIFFERENTIAL HALL SENSOR

[75] Inventor: Harald Leiderer, Woerth, Germany

[73] Assignee: Siemens Aktiengesellschaft, Munich, Germany

[21] Appl. No.: 156,885

[22] Filed: Nov. 23, 1993

[30] Foreign Application Priority Data

Nov. 23, 1992 [EP] European Pat. Off. ............. 92119905

[51] Int. Cl.$^6$ ............................ G01P 3/48; G01P 3/54; G01R 33/06
[52] U.S. Cl. ........................................ 324/174; 324/207.2
[58] Field of Search ........................... 324/207.2, 207.21, 324/207.24, 207.25, 251, 252, 173, 174

[56] References Cited

U.S. PATENT DOCUMENTS

| | | | |
|---|---|---|---|
| 4,518,918 | 5/1985 | Avery | 324/207.2 |
| 4,725,776 | 2/1988 | Onodera et al. | 324/252 |

FOREIGN PATENT DOCUMENTS

| | | |
|---|---|---|
| 0419040 | 3/1991 | European Pat. Off. . |
| 4025837 | 2/1992 | Germany . |

OTHER PUBLICATIONS

Siemens Publ. No. TLE 4920 F/G, Jul. 25, 1990, pp. 1–25 "Differential Gear Tooth Sensor IC TLE 4920 F/G".

*Primary Examiner*—Walter E. Snow
*Attorney, Agent, or Firm*—Herbert L. Lerner; Laurence A. Greenberg

[57] ABSTRACT

A configuration for contactless detection of the rpm or speed or of the position of a sensor part includes a differential Hall sensor having a carrier plate with two sides, a permanent magnet disposed on one of the sides, and Hall elements secured on the other of the sides for scanning teeth or segments and gaps of a sensor part of ferromagnetic material being rotatable about an axis or linearly movable in a given direction of motion. According to one embodiment, the carrier plate has an axis of symmetry being perpendicular to the carrier plate and perpendicular to the given direction of motion, and the permanent magnet has a direction of magnetization forming a predetermined magnetization angle with a normal to the given direction of motion. According to another embodiment, the carrier plate has an axis of symmetry being perpendicular to the carrier plate and forming a predetermined carrier plate angle with a normal to the given direction of motion, and the permanent magnet has a direction of magnetization forming a predetermined magnetization angle with a normal to the given direction of motion.

2 Claims, 1 Drawing Sheet

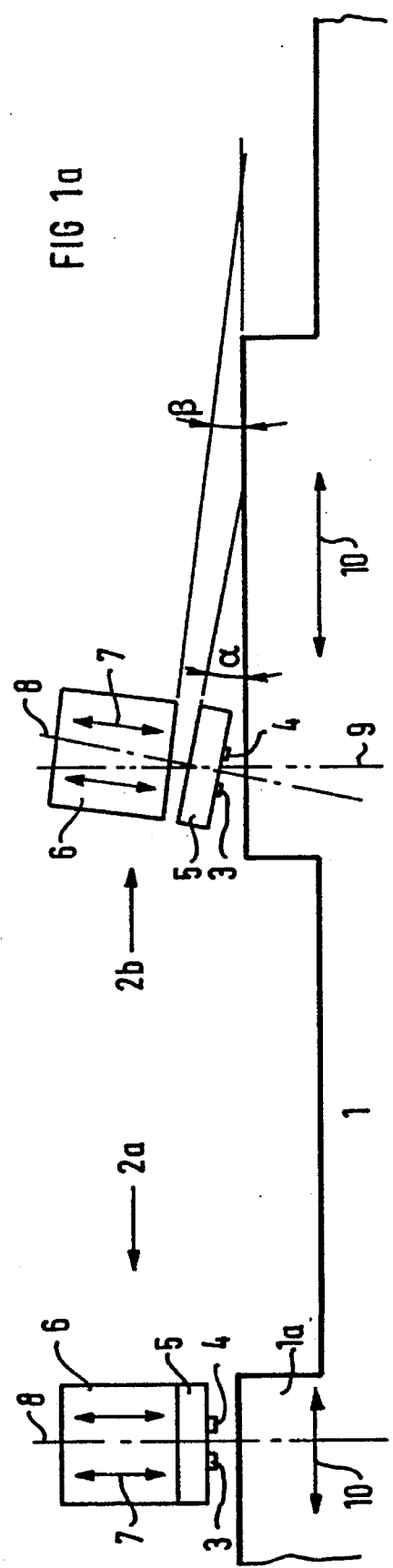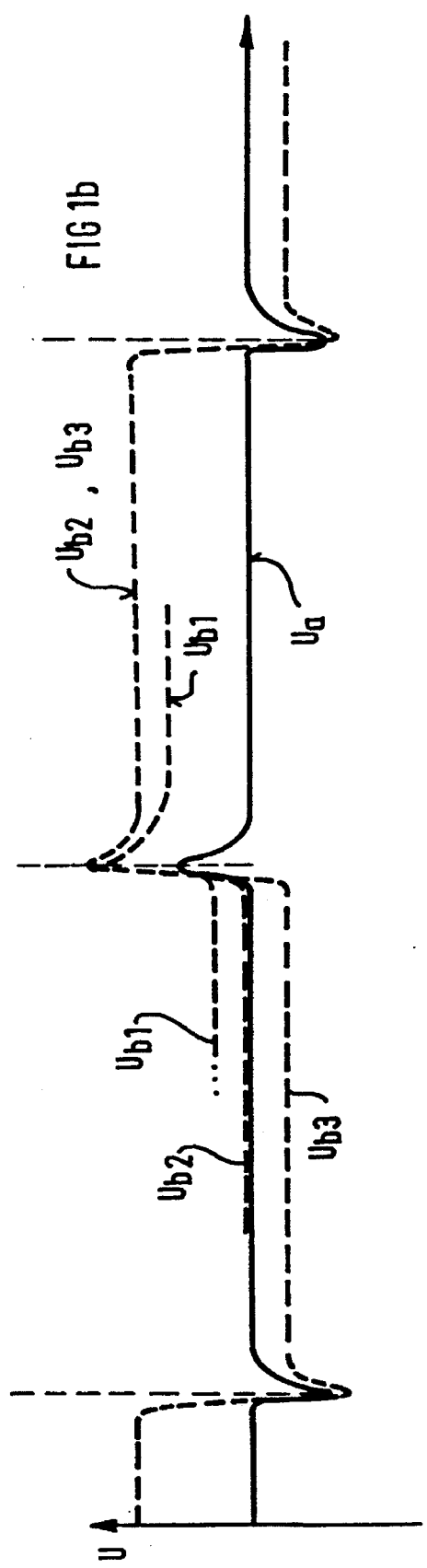

5,614,821

CONTACTLESS SPEED OR POSITION SENSOR USING A DIFFERENTIAL HALL SENSOR

BACKGROUND OF THE INVENTION

FIELD OF THE INVENTION

The invention relates to a configuration for contactless detection of the rpm or speed or of the position of a sensor part of ferromagnetic material being rotatable about an axis or linearly movable and having teeth or at least one segment, including a differential Hall sensor having a carrier plate with two sides, a permanent magnet disposed on one of the sides, and Hall elements secured on the other of the sides for scanning teeth or segments and gaps of the sensor part.

Such a configuration is known from a Siemens publication entitled Differential Gear Tooth Sensor IC TLE 4920 F/G.

The known differential Hall sensor includes two Hall elements which are secured to one side of a carrier plate that has another side on which a permanent magnet is disposed. The magnetic flux of the magnet penetrates both Hall elements simultaneously with the same flux density. If a soft magnetic part is moved past the Hall elements, then the two Hall elements are affected, depending on the position of the part. The influence can be detected from the output signal of an evaluation circuit connected to the Hall elements. For both the static and the dynamic case (relative standstill or relative motion between the Hall sensor and the sensor part), the same output signal results. If the width of the segments in motion is greater than the distance between the two Hall elements, then although the transition between the segment and a gap, or a gap and a segment, can be detected, nevertheless it cannot be detected whether the differential Hall sensor is located precisely above a segment or above a gap.

SUMMARY OF THE INVENTION

It is accordingly an object of the invention to provide a configuration for contactless detection of the rpm or speed or of the position of a sensor part, which overcomes the hereinafore-mentioned disadvantages of the heretofore-known devices of this general type and in which not only a transition from a segment to a gap or vice versa can be detected but also whether or not a differential Hall sensor is located precisely above a segment or a gap.

With the foregoing and other objects in view there is provided, in accordance with the invention, a configuration for contactless detection of the rpm or speed or of the position of a sensor part, comprising a differential Hall sensor having a carrier plate with two sides, a permanent magnet disposed on one of the sides, and Hall elements secured on the other of the sides for scanning teeth or at least one segment and gaps of a sensor part of ferromagnetic material being rotatable about an axis or linearly movable in a given direction of motion, the carrier plate having an axis of symmetry being perpendicular to the carrier plate and perpendicular to the given direction of motion, and the permanent magnet having a direction of magnetization forming a predetermined magnetization angle with a normal to the given direction of motion.

With the objects of the invention in view, there is also provided a configuration for contactless detection of the rpm or speed or of the position of a sensor part, comprising a differential Hall sensor having a carrier plate with two sides, a permanent magnet disposed on one of the sides, and Hall elements secured on the other of the sides for scanning teeth or at least one segment and gaps of a sensor part of ferromagnetic material being rotatable about an axis or linearly movable in a given direction of motion, the carrier plate having an axis of symmetry being perpendicular to the carrier plate and forming a predetermined carrier plate angle with a normal to the given direction of motion, and the permanent magnet having a direction of magnetization forming a predetermined magnetization angle with a normal to the given direction of motion.

In accordance with another feature of the invention, the magnetization angle is equal to the carrier plate angle.

In accordance with a further feature of the invention, the magnetization angle is different than the carrier plate angle.

Other features which are considered as characteristic for the invention are set forth in the appended claims.

Although the invention is illustrated and described herein as embodied in a configuration for contactless detection of the rpm or speed or of the position of a sensor part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1a is a fragmentary, diagrammatic, elevational view of a configuration of a differential Hall sensor and a sensor element, in a comparison between a known version and a version according to the invention; and FIG. 1b is a diagram showing output signals of the configurations.

DESCRIPTION OF THE PREFERRED EMBODIMENTS

Referring now to the figures of the drawing in detail and first, particularly, to FIG. 1a thereof, there is seen an example of a differential Hall sensor configuration for contactless detection of the speed or position of a linearly movable sensor part 1 (the same applies to a rotatable sensor part) having segments 1a and intervening gaps, in connection with which a differential Hall sensor 2b will be described and compared to a known differential Hall sensor 2a.

The two differential Hall sensors each include one carrier plate or substrate 5 having a side facing toward the sensor element 1 on which two Hall elements 3 and 4 are secured. A permanent magnet 6 with a magnetization direction 7 indicated by two arrows is disposed on the other side of the carrier plate 5.

The known differential Hall sensor 2a is disposed in such a way that an axis of symmetry 8 of the carrier plate 5 and the direction of magnetization 7 of the permanent magnet 6 are perpendicular to a direction of motion 10 of the sensor part 1.

Due to this symmetrical layout, identical output signals arise at the two Hall elements 3 and 4, and there is no differential signal at an evaluation circuit which is connected downstream if both Hall elements are located entirely above a segment or a gap. The evaluation circuit is not shown but is known from the Differential Gear Tooth Sensor IC TLE 4920 F/G reference mentioned above. An output signal $U_a$ of this known differential Hall sensor 2a is shown in a solid line in FIG. 1b. All that can be learned from that signal is if the Hall sensor is located precisely at a transition between a segment and a gap (which provides a negative pulse) or between a gap and a segment (which provides a positive pulse), but not if it is located completely above a segment or above a gap.

Accordingly, when the configuration is turned on, there is always a wait until the sensor part moves past such an "uncertainty point", before an appropriate finding can be made.

The situation is different with the configuration of the invention. Through the use of the invention, in the simplest case, with a position of the carrier plate 5 that is unchanged from the known configuration 2a, the direction of magnetization 7 of the permanent magnet 6 is modified in such a way that it forms a predetermined angle β, known as the magnetization angle, with a normal 9 to the direction of motion 10. This can be done by tipping or beveling the magnet 6. As a result of this configuration, the magnet field intensities or strengths at the two Hall elements differ slightly from one another and in this way also produce a static differential signal. The result is an output signal $U_{b1}$ of the differential Hall sensor 2b as is shown in dashed lines in FIG. 1b. The "gap" signal and the "segment" signal have the same algebraic sign (both positive or both negative) and differ in amplitude.

A greater difference between the two amplitudes is attainable if the known differential Hall sensor 2a is rotated by a predetermined angle α, known as the carrier plate angle, relative to the normal 9 to the direction of motion 10 of the sensor part 1, so that (if β=α) the two Hall elements 3 and 4 are given different distances from the segments 1a or the gaps. Accordingly, a differential signal $U_{b2}$ results, which is also shown in dashed lines in FIG. 1b. In this case, the "gap" signal become approximately zero, so that the difference becomes greater than with the output signals $U_{b1}$.

The "gap" signal may even be moved into the negative range (illustrated by an output signal $U_{b3}$ in FIG. 1b) as compared with the "segment" signal if, with the carrier plate 5 tilted by the carrier plate angle α, the direction of magnetization 7 of the permanent magnet 6 is rotated relative to the normal 9 to the direction of motion 10 of the sensor part 1, by a magnetization angle β that is different from α. This last case is illustrated in FIG. 1a for the differential Hall sensor 2b.

It is highly advantageous that upon a change from a segment to a gap or vice versa, the output signal 2b, both statically and dynamically, somewhat overshoots the amplitude that it attains if the Hall sensor is located entirely above a gap or a segment. As a result, in each case, a reliable switchover of a following comparator is attained, particularly if this element switches with hysteresis.

The embodiment described above for a linearly movable sensor part can readily be adopted for a sensor part that is rotatable about an axis. In that case, the normal to the radius of the sensor part that passes through the center of the carrier plate 5 should be considered to be the direction of motion 10.

A proven embodiment with a rotatable segment sensor having a segment length of 180° has a carrier plate angle α=10° and a magnetization angle β=9°.

I claim:

1. A configuration for contactless detection of the rpm or speed or of the position of a sensor part, comprising:

a differential Hall sensor having a carrier plate with two sides, a permanent magnet disposed on one of said sides, and two Hall elements secured on the other of said sides for scanning teeth or segments and gaps of a sensor part of ferromagnetic material being rotatable about an axis or linearly movable in a given direction of motion, said carrier plate having an axis of symmetry being perpendicular to said carrier plate and forming a predetermined carrier plate angle with a normal to the given direction of motion, and said permanent magnet having a direction of magnetization forming a predetermined magnetization angle other than zero with a normal to the given direction of motion, wherein the magnetization angle is different than the carrier plate angle.

2. The configuration according to claim 1, wherein said differential Hall sensor defines means for distinguishing whether said differential Hall sensor faces a gap or a tooth or segment of the sensor part at any one time.

* * * * *